Figure 1:
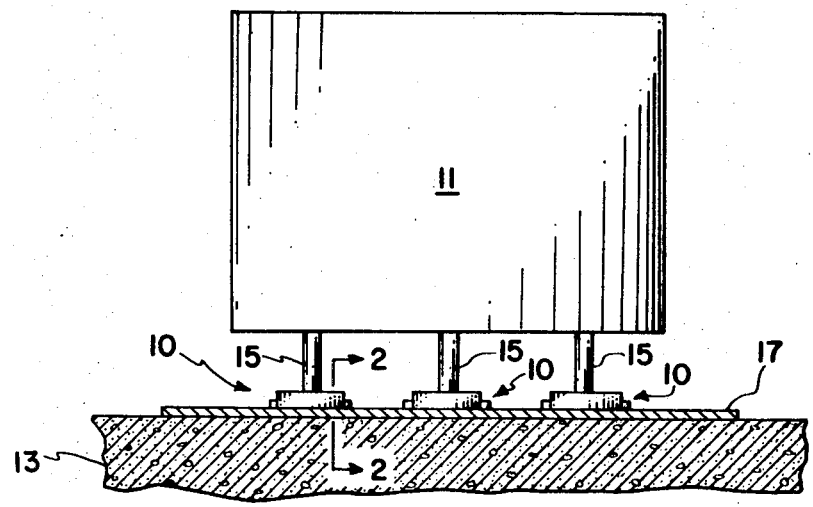

United States Patent

[11] 3,610,365

| [72] | Inventors | James W. Maddox<br>Pocomoke;<br>Frank T. Wolf, Stockton, both of Md. |
|---|---|---|
| [21] | Appl. No. | 47,062 |
| [22] | Filed | June 17, 1970 |
| [45] | Patented | Oct. 5, 1971 |
| [73] | Assignee | The United States of America as represented by the Adminstrator of the National Aeronautics and Space Administration |

[54] AIR BEARING
10 Claims, 3 Drawing Figs.

[52] U.S. Cl. .................................................. 180/125,
180/127, 308/5, 308/9, 308/DIG. 1
[51] Int. Cl. .................................................. B60v 1/00
[50] Field of Search ........................................ 308/5, 9,
DIG. 1; 180/125, 127

[56] References Cited
UNITED STATES PATENTS

| 3,116,897 | 1/1964 | Theed | 180/125 |
|---|---|---|---|
| 3,034,837 | 5/1962 | Barker | 308/9 |
| 3,140,753 | 7/1964 | Bertin | 308/9 |

FOREIGN PATENTS

| 245,422 | 3/1963 | Australia | 180/127 |
|---|---|---|---|
| 276,520 | 10/1965 | Australia | 180/127 |

Primary Examiner—Edgar W. Geoghegan
Assistant Examiner—R. H. Lazarus
Attorneys—Howard J. Osborn, Wallace J. Nelson and John R. Manning ABSTRACT: An air bearing for use in an exterior environment to facilitate movement of a heavy load in a horizontal plane including a flexible peripheral seal to direct the flow of pressurized air toward a metal plate surface and toward a central air outlet, and a floating wiper circumferentially disposed about the air bearing body to keep sand and dirt off the bearing lifting area.

3,610,365

AIR BEARING

ORIGIN OF THE INVENTION

This invention was made by employees of the National Aeronautics and Space Administration and may be manufactured and used by or for the Government of the United States without the payment of any royalties thereon or therefor.

This invention relates to an improved air bearing and relates in particular to an air bearing that can be utilized in field applications for the rotation of heavy, unbalanced loads such as a two-ton portable radar unit that must be rotated 360° around a central point on a horizontal plane. Previously these heavy radar units have been rotated on wheels but this has not proved satisfactory in meeting the requirements for the various azimuth changes. Additionally, the repositioning of radar units involved much time and effort and in some cases, the study of landing approach of aircraft and other use of the radar has been limited.

It is therefore an object of the present invention to provide a novel air bearing to facilitate movement of heavy loads.

Another object of the present invention is an air bearing capable of use on a mill-finish material surface.

Another object of the present invention is a novel air bearing structure that conserves the air supply used therewith.

Another object of the present invention is an air bearing for use in an exterior environment in field applications.

Another object of the present invention is an air bearing that maintains a clean operating surface.

The foregoing and other objects are attainable by the present invention by providing an air bearing connected to the legs or other structure supporting a heavy load wherein the air bearing is provided with a cylindrical body having a circular bearing face thereon facing a concrete, or the like, supporting surface for the heavy load, and a metal plate on the supporting surface adjacent the circular bearing surface. A suitable source of pressurized air is provided in fluid connection with a first air passage in the cylindrical body leading to the bearing surface and a flexible circular seal is disposed between the bearing surface and the metal plate to confine air from the pressurized source to an area between the bearing surface and metal plate. A second air passage leads through the cylindrical body from the bearing surface to the ambient environment and serves to convey excess air pressure from the area defined by the circular seal, bearing surface and metal plate to the ambient environment. A pressure relief valve in fluid connection with the second air passage controls the release of this excess air pressure. This unique design for an air bearing serves to conserve the air supply used therewith more than 10 times greater than conventional air bearings when employed under similar circumstances.

A plurality of air bearings of this type may be employed to facilitate movement of any heavy load, particularly in rotating a heavy load about a central point on a horizontal plane.

Figure 3:
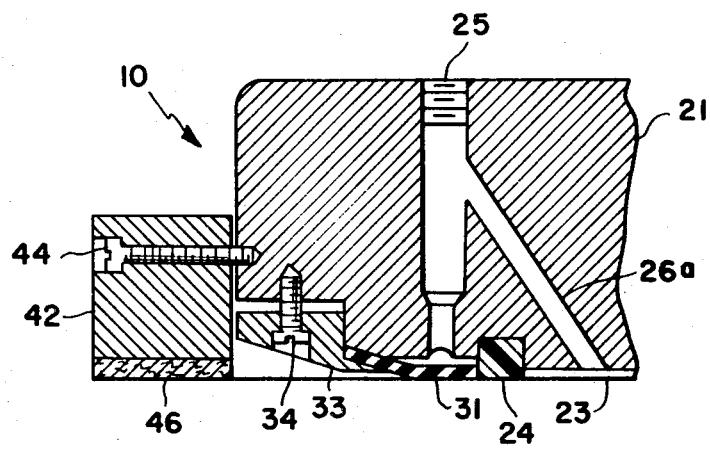
Figure 2:
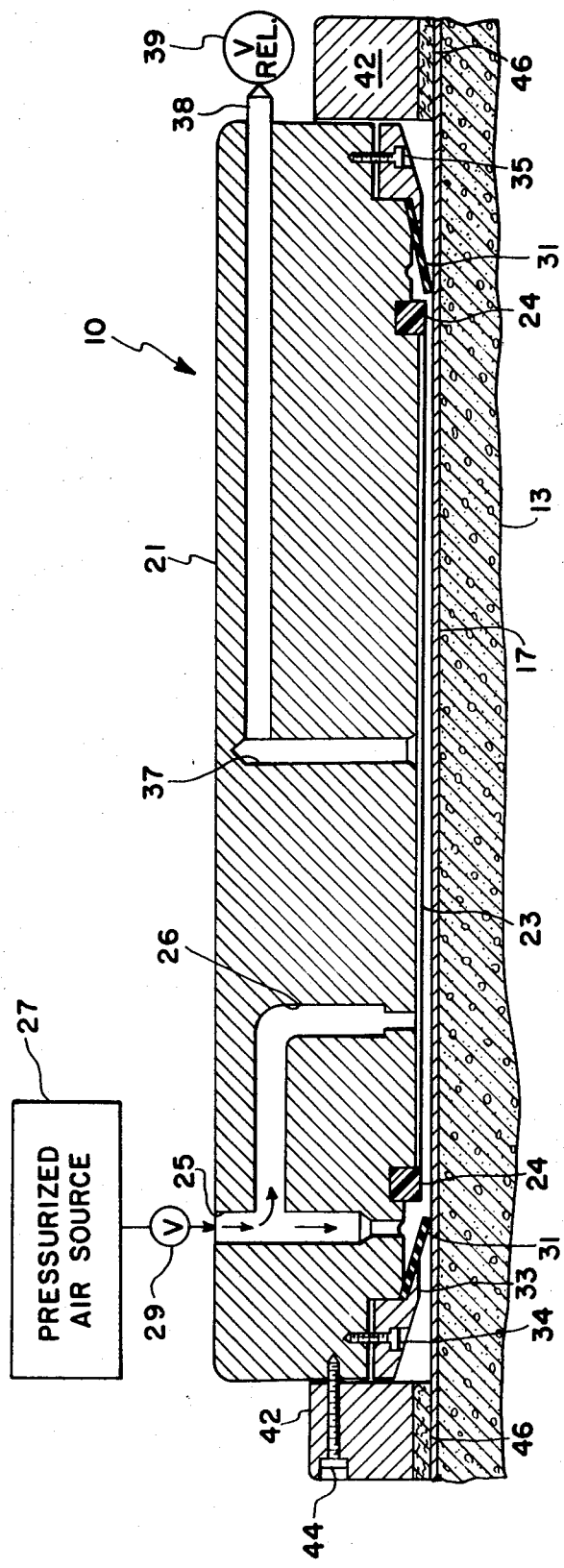

A more complete appreciation of the invention and many of the attendant advantages thereof will be more clearly understood by reference to the following detailed description when taken in connection with the accompanying drawings wherein:

FIG. 1 is a part elevation, part section view of a heavy portable apparatus supported by a plurality of air bearing on a planar surface, in accordance with the present invention;

FIG. 2 is a cross-sectional view of a specific air bearing in accordance with the present invention, taken along line 2—2 of FIG. 1 and showing the air bearing in the pressurized condition necessary to assist in movement of a heavy load; and FIG. 3 is a section of a part of the air bearing shown in FIG. 2 showing the air bearing in the static or unpressurized condition and illustrating a slight modification of the forked air inlet passageway.

Referring now to the drawings, FIG. 1 shows a plurality of air bearings, generally designated by reference numeral 10, supporting a heavy load 11 on a concrete platform 13. The heavy load 11, in one application of the present invention, consisted of a two-ton, unbalanced, portable radar unit adapted for 360° rotation around a central point on a horizontal plane. This unit was removed from the springs and wheels normally used for support and mounted on leveling jacks as designated by reference numeral 15. Air bearings 10 form the foot portion of leveling jacks 15 and bear against a smooth metal plate 17, such for example aluminum, atop the concrete platform 13. Metal plate 17 is provided with only a mill-finish surface and the precision, flat, smooth surface normally required for conventional air bearings is not required due to the unique features incorporated in the present invention.

Referring now more particularly to FIGS. 2 and 3, the details of air bearing 10 will now be described. Each air bearing 10 has a cylindrical body 21 which is provided with an indented circular bearing surface 23 and a rigid circular plastics bearing surface or insert 24 facing metal plate 17. The plastic ring-shaped insert 24 is formed of Teflon or other suitable plastics material and is retained in position by conventional means, such for example countersunk screws, not shown. Plastics insert 24 prevents metal-to-metal contact between bearing surface 23 and metal plate 17. A forked air passageway 25 and 26 extends through body 21 and is provided in fluid communication with a suitable pressurized air source 27. A suitable valve 29 selectively controls the flow of pressurized air from source 27 to passageway 25 and 26. (In FIG. 3 reference numeral 26a designates a slight modification of one fork of the air passageway.) A circular seal 31 formed of a suitable flexible material normally closes passageway form 25 and prevents any dust, sand or other debris from entering the passageway. Seal 31 is in the form of a hollow frustum of a cone and is directed toward the longitudinal central axis of cylindrical body 21 with the normal weight of body 21 causing the flexible seal to bend as shown in FIG. 3 to close passageway 25 when bearing 10 is in the static condition. A retaining ring element 33 is attached to body 21 by suitable bolts, two of which are shown and designated by reference numerals 34 and 35. Ring 33 has an integral internal flange portion which bears against approximately one-half the width of circular seal 31 to confine the seal against body 21. The remaining half-width or internal circumferential half portion is free-floating. Thus, when pressurized air flows through passageway forks 25 and 26 sufficiently to lift body 21, seal 31 will move from the position shown in FIG. 3 to that shown in FIG. 2 and serve to confine the pressurized air in the area defined by seal 31, circular bearing surface 23 and plate 17.

A second air passageway 37 leads from circular bearing surface 23 to the exterior of cylindrical body 21. A suitable relief valve 39 is provided in fluid communication with passageway 37 by way of conduit 38. Passageway 37, conduit 38 and relief valve 39 serve to convey excess air from the area defined by circular bearing surface 23, seal 31 and plate 17 to the ambient environment to thereby insure that the air pressure in this area does not exceed a predetermined maximum.

A circumferential wiper ring 42 is attached to cylindrical body 21 by a plurality of bolts, one of which is shown in FIGS. 2 and 3 and designated by reference numeral 44. A compressible ring layer 46, such for example a felt material layer, is adhesively or otherwise conventionally secured to wiper ring 42 so as to engage metal plate 17. When air bearing 10 is in the static condition as shown in FIGS. 1 and 3, the weight of the bearing and attached structure will compress ring layer 46 slightly to thereby prevent any sand, dust, or other debris from entering the area between metal plate 17 and bearing surface 23. When air bearing 10 is pressurized to assist in moving the attached heavy load as shown in FIG. 2, ring layer 46 expands so as to maintain light contact with metal plate 17. Thus, as the air bearing 10 and its attached load are moved, ring layer 46 will wipe metal plate 17 clean of debris to insure that the area of plate 17 disposed beneath bearing surface 23 remains relatively free of all foreign matter.

OPERATION

The operation of the invention is now believed apparent. In one specific application of the invention air bearings 10 were attached to assist in the rotation of a two-ton, unbalanced portable radar unit 360° around a central point on a horizontal plane. This unit was previously mounted on springs and wheels and these were removed to allow more rigidity and the unit mounted on three leveling jacks 15. Three air bearing units 10 were attached to these three leveling jacks so as to contact metal plate 17 positioned on concrete platform 13. The metal plate employed was a mill-finished aluminum plate. Since conventional air pressure bearings require a 0.001-inch precision flat smooth surface, these conventional bearings are obviously impractical for field applications. The air bearings 10 were connected in a conventional manner to a source of air pressure. Individual air bottles or a central air supply may be employed as the pressurized air source. A regulator valve 29 insures that the air pressure employed is in the range of 28–30 pounds and the relief valve 39 serves to maintain a pressure of 22–24 pounds within the bearing lift area. This arrangement proved capable of lifting the two-ton radar unit up to 0.188-inch thereby enabling one person to pivot the unit to a new azimuth setting with little effort. The air bearing units employed were approximately 12 inches in diameter and 2 inches in depth. Teflon sheet material was employed for the flexible seal 31 although other plastics or rubber materials would be adequate to confine the air pressure within the area defined by the seal, circular bearing surface and metal plate. By extending the free-floating width of seal 31 greater lifting heights may be readily attained.

Although the invention has been described relative to a specific embodiment thereof, it is not so limited and variations and modifications will be readily apparent to those skilled in the art without departing from the spirit or scope of the invention as defined in the appended claims.

What is claimed as new and desired to be secured by Letters Patent of the United States is:

1. An air bearing for use in an exterior environment to facilitate movement of a heavy load in a horizontal plane, comprising in combination with a support structure:
   a cylindrical body having a circular bearing surface thereon facing said support structure,
   a metal plate carried by said support structure and disposed adjacent said circular bearing surface,
   a pressurized air source,
   a first air passage within said body and serving to direct air from said source to the area between said circular bearing surface and said metal plate,
   a circular seal disposed between said circular bearing surface and said metal plate,
   said circular seal serving to maintain said first air passage closed when pressurized air is not flowing therethrough and adapted to open said air passage under the influence of air pressure and move into position to effect a seal between said body and said metal plate to essentially confine the pressurized air flowing through said passage between said circular bearing surface and said metal plate, and
   a second air passage within said body serving to convey excess air from between said bearing surface and said metal plate to the ambient environment.

2. The air bearing of claim 1 wherein said circular seal is a ring-shaped, pliable material and further including a seal retainer ring fastened to said body and serving to tightly engage essentially the exterior half of said ring-shaped seal between said retainer ring and said body, the interior half of said seal being free-floating, said free-floating half being maintained adjacent said first air passage by the weight of said body in the absence of pressurized air flowing through said passage and movable under the influence of air pressure to open said first air passage and act as an effective circular air seal to confine the air flowing through said first air passage between said metal plate and said circular bearing surface.

3. The air bearing of claim 2 wherein said ring-shaped pliable material is a plastics.

4. The air bearing of claim 1 including a pressure relief valve in fluid communication with said second air passage and serving to maintain the air pressure between said circular bearing surface and said metal plate within a predetermined pressure range.

5. The air bearing of claim 4 wherein the pressurized air flowing through said first air passage is in the range of 28–30 pounds and said pressure relief valve maintains a pressure of 22–24 pounds within the area confined by said circular bearing plate, said circular seal and said metal plate.

6. The air bearing of claim 1 including:
   a wiper ring circumferentially disposed around and integral with said cylindrical body.

7. The air bearing of claim 1 including a ring-shaped plastics insert circumscribing said circular bearing surface and adapted to support said air bearing on said metal plate when said air bearing is in static condition to thereby prevent metal to metal contact between said air bearing and said metal plate.

8. An air bearing adapted for use in an exterior environment to permit 360° rotation of a load around a central point and on a horizontal plane, comprising:
   a body having a circular bearing surface facing a support structure,
   a metal, of pressurized air in fluid communication with said body,
   a metal plate carried by the support structure and disposed adjacent said circular bearing surface,
   a wiper ring circumferentially disposed around and integral with said body,
   a resilient ring structure integral with said wiper ring and disposed between said wiper ring and said metal plate,
   a first air passage within said body for directing pressurized air between circular bearing surface and said metal plate,
   a circular seal disposed between said circular bearing surface and said metal plate,
   said circular seal serving to seal said first air passage when said air bearing is in static condition and movable under the force of air pressure from said source to effect an air seal between said body and said metal plate to essentially confine the pressurized air flowing through said passage between said circular bearing surface and said metal plate, and
   a second air passage within said body and serving to convey excess air from between said bearing surface and said metal plate to the ambient environment.

9. The air bearing of claim 8 including a pressure relief valve in fluid communication with said second air passage, said pressure relief valve serving to convey air from the space defined by said circular bearing surface, said circular seal and said metal plate to the ambient environment when the pressure in this space reaches a predetermined maximum.

10. The air bearing of claim 8 wherein said circular seal is in the form of a hollow frustum of a cone when moved under the influence of air pressure beneath said body.